(12) United States Patent
Plagge et al.

(10) Patent No.: US 9,251,701 B2
(45) Date of Patent: Feb. 2, 2016

(54) CONTROL DEVICE WITH PASSIVE REFLECTOR

(71) Applicant: MICROSOFT TECHNOLOGY LICENSING, LLC, Redmond, WA (US)

(72) Inventors: Mark Plagge, Sammamish, WA (US); Vijay Baiyya, Bellevue, WA (US); Tommer Leyvand, Seattle, WA (US); Susan Shuchen Song, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/767,634

(22) Filed: Feb. 14, 2013

(65) Prior Publication Data
US 2014/0228124 A1 Aug. 14, 2014

(51) Int. Cl.
*G08C 23/04* (2006.01)
*A63F 13/20* (2014.01)

(52) U.S. Cl.
CPC ............... *G08C 23/04* (2013.01); *A63F 13/06* (2013.01); *A63F 2300/1043* (2013.01); *A63F 2300/1087* (2013.01); *A63F 2300/1093* (2013.01); *A63F 2300/403* (2013.01)

(58) Field of Classification Search
USPC ............. 250/206.2, 338.1; 345/158; 356/623; 359/530, 872; 463/36–39
See application file for complete search history.

(56) References Cited

U.S. PATENT DOCUMENTS

| 6,142,876 | A | 11/2000 | Cumbers |
| 7,636,456 | B2 | 12/2009 | Collins et al. |
| 7,976,387 | B2 * | 7/2011 | Venkatesh et al. ............. 463/37 |
| 8,179,366 | B2 | 5/2012 | Richardson et al. |
| 8,184,097 | B1 | 5/2012 | Barney et al. |
| 8,282,465 | B2 | 10/2012 | Giobbi |
| 2001/0034257 | A1 | 10/2001 | Weston et al. |
| 2005/0221895 | A1 | 10/2005 | Lum et al. |
| 2006/0079328 | A1 * | 4/2006 | Wang .............................. 463/37 |
| 2006/0154712 | A1 | 7/2006 | Lum et al. |
| 2006/0238492 | A1 * | 10/2006 | Fouquet et al. ............... 345/156 |
| 2007/0111796 | A1 | 5/2007 | Giaimo, II et al. |
| 2007/0211239 | A1 | 9/2007 | Mandella et al. |

(Continued)

FOREIGN PATENT DOCUMENTS

| JP | 2010055219 A | 3/2010 |
| JP | 2011101736 A | 5/2011 |

(Continued)

OTHER PUBLICATIONS

Leyvand, et al., "Kinect Identity—Technology and Experience", Retrieved at <<http://ieeexplore.ieee.org/stamp/stamp.jsp?tp=&arnumber=5742015>>, IEEE, Computer, vol. 44, Issue 4, Apr. 2011, 4 pages.

(Continued)

*Primary Examiner* — Jason Yen
(74) *Attorney, Agent, or Firm* — Gregg Wisdom; Judy Yee; Micky Minhas

(57) ABSTRACT

A control device includes a housing. The control device also includes a wireless communicator interior the housing. The wireless communicator wirelessly sends commands for controlling an electronic device, such as a game console. The control device also includes a reflector positioned to reflect light directed at the housing.

13 Claims, 7 Drawing Sheets

(56) References Cited

U.S. PATENT DOCUMENTS

| | | | |
|---|---|---|---|
| 2007/0236452 A1* | 10/2007 | Venkatesh et al. | 345/158 |
| 2008/0174550 A1 | 7/2008 | Laurila et al. | |
| 2008/0261693 A1 | 10/2008 | Zalewski | |
| 2008/0300055 A1 | 12/2008 | Lutnick et al. | |
| 2009/0009469 A1 | 1/2009 | Hsu et al. | |
| 2009/0079711 A1 | 3/2009 | Monney et al. | |
| 2009/0159799 A1* | 6/2009 | Copeland et al. | 250/338.1 |
| 2009/0176565 A1 | 7/2009 | Kelly | |
| 2009/0221374 A1 | 9/2009 | Yen et al. | |
| 2009/0231269 A1 | 9/2009 | Ueshima et al. | |
| 2009/0278030 A1* | 11/2009 | Deliwala | 250/206.2 |
| 2009/0279107 A1* | 11/2009 | Deliwala | 356/623 |
| 2009/0298590 A1 | 12/2009 | Marks et al. | |
| 2009/0315740 A1 | 12/2009 | Hildreth et al. | |
| 2010/0144436 A1 | 6/2010 | Marks et al. | |
| 2010/0202075 A1* | 8/2010 | Blank et al. | 359/872 |
| 2010/0277801 A1* | 11/2010 | Nakajima | 359/530 |
| 2011/0025598 A1 | 2/2011 | Underkoffler et al. | |
| 2011/0118032 A1 | 5/2011 | Zalewski | |
| 2011/0175810 A1 | 7/2011 | Markovic et al. | |
| 2011/0230269 A1 | 9/2011 | Serafat et al. | |
| 2011/0317871 A1 | 12/2011 | Tossell et al. | |
| 2012/0004035 A1* | 1/2012 | Rabin | 463/36 |
| 2012/0075463 A1 | 3/2012 | Chen et al. | |
| 2012/0174199 A1 | 7/2012 | Perrin et al. | |
| 2012/0206345 A1 | 8/2012 | Langridge | |
| 2012/0262365 A1 | 10/2012 | Mallinson | |
| 2012/0268249 A1 | 10/2012 | Kansal et al. | |
| 2012/0302349 A1 | 11/2012 | Marks et al. | |
| 2013/0002550 A1* | 1/2013 | Zalewski | 345/158 |
| 2013/0063344 A1 | 3/2013 | Obermuller et al. | |
| 2013/0130800 A1 | 5/2013 | Sirilux et al. | |
| 2014/0228124 A1 | 8/2014 | Plagge et al. | |

FOREIGN PATENT DOCUMENTS

| | | |
|---|---|---|
| WO | 2008056275 A1 | 5/2008 |
| WO | 2010051089 A1 | 5/2010 |
| WO | 2011090886 A2 | 7/2011 |
| WO | 2012067946 A2 | 5/2012 |
| WO | 2010138743 A2 | 12/2012 |

OTHER PUBLICATIONS

Zhang, et al., "Microsoft Kinect Sensor and Its Effect", Retrieved at <<http://ieeexplore.ieee.org/stamp/stamp.jsp?tp=&arnumber=6190806>>, IEEE, MultiMedia, vol. 19, Issue 2, Feb. 2012, 7 Pages.

"Skeletal Tracking", Retrieved at <<http://msdn.microsoft.com/en-us/library/hh973074.aspx>>, Retrieved Date: Oct. 1, 2012, 4 Pages.

"Skeleton Tracking with the Kinect", Retrieved at <<http://learning.codasign.com/index.php?title=Skeleton_Tracking_with_the_Kinect>>, Retrieved Date: Oct. 1, 2012, 10 Pages.

Chertoff, et al., "An Exploration of Menu Techniques Using a 3D Game Input Device", Retrieved at <<http://www.eecs.ucf.edu/~jjl/pubs/Chertoff_final.pdf>>, In Proceedings of the 4th International Conference on Foundations of Digital Games, Apr. 26, 2009, pp. 8.

Lee, et al., "Arcade Video Game Platform Built Upon Multiple Sensors", Retrieved at <<http://cfs9.tistory.com/attach/4/tistory/2008/09/30/14/09/48e1b4837f00a>>, In IEEE International Conference on Multisensor Fusion and Integration for Intelligent Systems, Aug. 20, 2008, pp. 3.

Baiyya, et al., "Associating an Object With a Subject", U.S. Appl. No. 13/679,931, filed Nov. 16, 2012, pp. 40.

Baiyya, et al., "Binding Control Devices to a Computing System", U.S. Appl. No. 13/679,941, filed Nov. 16, 2012, pp. 40.

ISA European Patent Office, International Search Report and Written Opinion for Patent Application No. PCT/US2013/070378, Feb. 5, 2014, 12 pages.

ISA European Patent Office, International Search Report and Written Opinion for Patent Application No. PCT/US2013/070411, Feb. 10, 2014, 10 pages.

ISA European Patent Office, International Search Report of PCT/US2014/015465, May 28, 2014, WIPO, 11 pages.

ISA European Patent Office, Written Opinion of the International Preliminary Examining Authority in International Application No. PCT/US2014/015465, Oct. 20, 2014, WIPO, 5 pages.

* cited by examiner

CONTROL DEVICE WITH PASSIVE REFLECTOR

BACKGROUND

Association of a control device with a specific user typically involves multiple levels of interaction between the control device, the user, and a computing system. The association may also remain until a user specifically requests to update the control device with a new association or the computing system determines that the player association has changed and needs to be updated.

SUMMARY

A control device includes a housing. The control device also includes a wireless communicator interior the housing. The wireless communicator wirelessly sends commands for controlling an electronic device, such as a game console. The control device also includes a reflector, such as a retroreflector, positioned to reflect light directed at the housing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to a control device that includes a reflector capable of reflecting light that is emitted towards the reflector. For example, the control device may include a retroreflector capable of retroreflecting infrared light emitted from a depth camera system or other environmental illuminator. An infrared camera may then recognize this reflected infrared light and use it to locate and track the control device that includes the retroreflector. This type of passive locating and tracking may be performed instead of or in addition to active locating and tracking, in which the control device actively emits an infrared light from a beacon.

Figure 1:
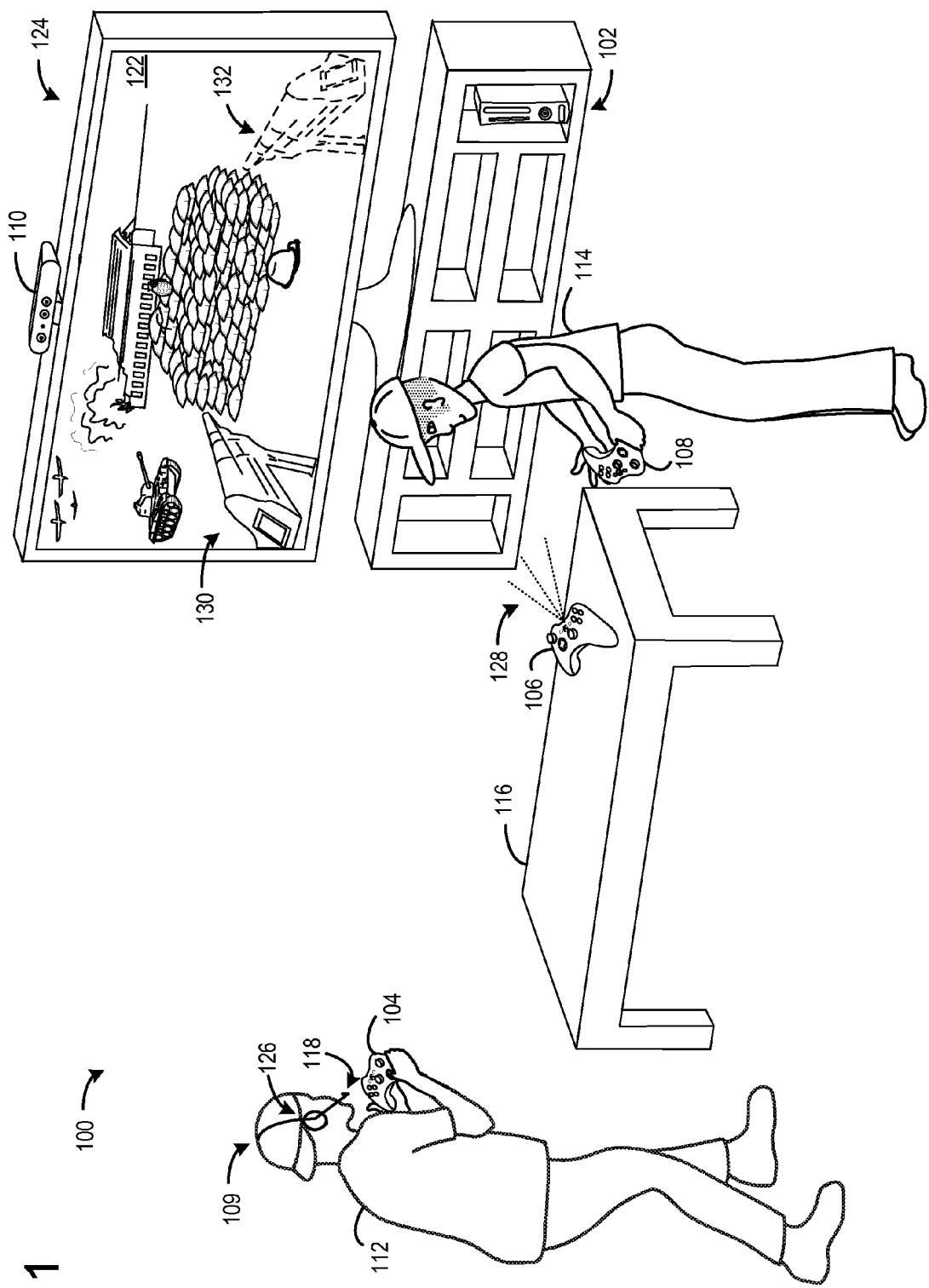
FIG. 1 schematically shows a non-limiting example of an environment including a computing system and one or more wireless control devices in accordance with an embodiment of the present disclosure.

FIG. 1 shows an example environment 100 including computing system 102 and control devices 104, 106, 108, and 109. Although environment 100 is illustrated as a room, environment 100 may be any suitable physical space, including indoor and/or outdoor environments. Computing system 102 may be configured to receive input from and/or communicate with control devices 104, 106, 108, and 109. Control devices in accordance with the present disclosure may include any suitable control device, including but not limited to game controllers, audio headphones and/or headsets, remote controls, musical instruments (e.g., guitar, drums, etc.), steering wheel controllers, flightsticks, weapons (e.g., sword, laser sword, pistol, rifle, saber, halberd, nunchaku, etc.), mobile computing devices, etc. In the illustrated embodiment, control devices 104, 106, and 108 take the form of game controllers and control device 109 takes the form of an audio headset.

Computing system 102 may include an imaging device, such as depth camera 110. For example, depth camera 110 may include one or more sensors, lens elements, and/or light sources that are configured to image environment 100. Depth camera 110 may utilize any suitable depth imaging technology, including but not limited to a time-of-flight depth camera and/or a structured light depth camera. As such, the depth camera may include an infrared camera. Depth camera 110 may include additional sensors, including but not limited to a visible light camera and/or one or more microphones. Depth camera 110 may generate and send infrared images and/or depth images to computing system 102. The depth images may indicate a depth of a surface imaged by each pixel of the depth images in order to provide information regarding one or more features of environment 100.

As further illustrated in FIG. 1, environment 100 may include one or more human subjects, such as game player 112 and game player 114, and one or more non-human subjects, such as table 116. In some embodiments, one or more users, such as game player 112, may interact with computing system 102. For example, Computing system 102 may provide visual output to game player 112 in any suitable manner, such as through display 122 of display device 124. Computing system 102 may also provide audio output to game player 112 in any suitable manner, including through one or more audio devices, such as audio headphones 126 of control device 109 and/or speakers of display device 124.

Game player 112 may provide input to computing system 102 via one or more user input devices, such as control device 104, depth camera 110, microphone 118 of control device 109, and/or any other suitable user input device. User input devices, such as those described above, may communicate with computing system 102 in any suitable manner, including but not limited to wired and/or wireless communication. For example, a control device may provide user input to computing system 102 in the form of commands that are sent over a radiofrequency (RF) communication channel. In some embodiments, each of a plurality of control devices and/or other objects may communicate over a particular RF channel and/or provide a unique identifier during communication in order to distinguish a particular control device from another control device.

Objects, such as control devices, user input/output devices, and the like, may also be configured to interact with computing system 102 by emitting a beacon. For example, as illustrated in FIG. 1, control device 106 may emit beacon 128. Beacon 128 may comprise any suitable beacon, including but not limited to an audio and/or optical beacon. For example, beacon 128 may include an infrared light beacon, a visible light beacon, a sonar beacon, and/or any suitable electromagnetic signal. In some embodiments, the beacon may only be emitted in response to a request or other message from a computing system. Beacon 128 may be used to determine a source of user input and/or a location of an object. Determining a source of user input may allow computing system 102 to provide a dynamically adjustable user experience. For example, content of an application may be customized based on a particular user providing input. In some embodiments, content of an application may be tied to a control device. For example, an audio output of an application providing sound to an audio headphone may be adjusted based on a position of the audio headphone.

Control devices and/or other objects may also be distinguished from one another via a directed, round-robin, and/or time-sliced scheduling of message transmission. For example, a control device may be assigned one or more time slices during which the controller will emit active infrared light. In response, the computing system may distinguish each control device by determining a time and/or order of received signals and associating the source of the signal with the control device assigned to that time. Accordingly, the computing system may detect and associate the beacon that it observes with an object that it communicates with via another communications medium, such as RF, wired cable, etc.

Identifying a source of user input may also enable cooperation between multiple user input and/or control devices. For example, an audio headset may be associated with a control device such that audio input provided to the audio headset may supplement input provided to the control device. Gestures that are detected by a control device, depth camera, and/or other suitable gesture detection device may also be associated with a particular control device such that gesture-based commands may supplement input provided to the control device. For example, computing system 102 may determine that a gesture is performed by a particular user and/or in a particular location and associate the gesture with a control device based on the determined user and/or location.

Accordingly, in multi-user environments, a first user, such as game player 112 may provide input via control device 104 and control device 109 while a second user, such as game player 114 provides input via control device 108. By associating each control device with a respective user, computing system 102 may provide a multiplayer gaming experience. For example, user input provided by control device 104 and/or control device 109 may be applied to a first player representation 130 and user input provided by control device 108 may be applied to a second player representation 132. Likewise, audio associated with a first player representation may be directed to headphones 126 of control device 109, while audio associated with a second player representation may be directed to speakers of display device 124 and/or another suitable audio device.

Figure 2:
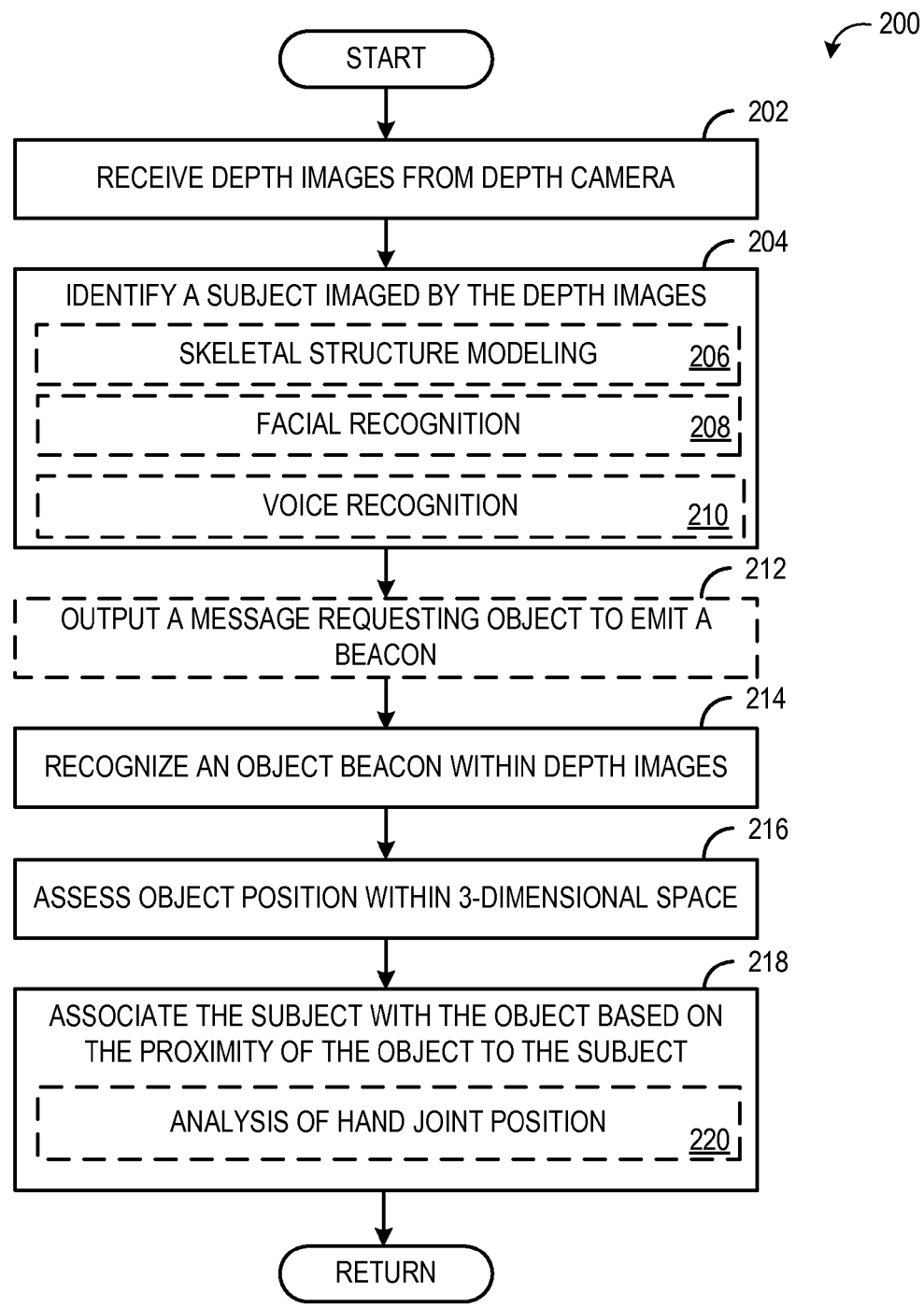
FIG. 2 shows a method of associating an object with a subject in accordance with an embodiment of the present disclosure.

FIG. 2 shows an example method 200 of associating an object with a subject according to an embodiment of the present disclosure. Method 200 may be performed by a computing system, such as computing system 102 of FIG. 1. At 202, method 200 includes receiving one or more depth images from a depth camera. For example, computing system 102 may receive depth images from depth camera 110 of FIG. 1. In some embodiments, computing system 102 may include an infrared sensor to detect infrared signals. In such embodiments, the computing system may receive one or more infrared images from an infrared signal instead of or in addition to receiving one or more depth images at 202. In additional or alternative embodiments, the computing system may receive two-dimensional images from a visible light (e.g., RGB) camera, heat map, and/or other suitable image source alone or in combination with an infrared sensor.

At 204, method 200 includes identifying a subject imaged by the depth images. In some scenarios, the subject is a human subject, such as game player 112 of FIG. 1. In some scenarios, the subject may be an inanimate object, such as table 116 and/or control devices 104, 106, 108, and/or 109 of FIG. 1. For embodiments in which a computing system includes an infrared sensor, as discussed above, the computing system may identify a subject imaged by the infrared images. For example, the computing system may analyze an infrared reflectivity of each pixel of an infrared image in order to determine a position of an object, beacon, retroreflector, and/or subject. In some embodiments, the computing system may utilize an infrared sensor to track and determine a two-dimensional location and a depth camera to calculate a depth value for the two-dimensional location. The computing system may analyze virtually any type of electromagnetic information to determine a location of an object, beacon, retroreflector, and/or subject without departing from the scope of this disclosure.

In the case of a human subject, identification may be specific to a particular individual. In other words, the identity of a particular person may be identified. For example, computing system 102 of FIG. 1 may identify game player 112 as being "John," where "John" may be described by a user profile stored locally and/or remotely on a storage machine of computing system 102 and/or a database. The user profile may include any suitable information to identify a game player, including but not limited to virtual skeleton data, facial recognition data, audio parameters, etc. The user profile may be locally saved and/or accessed via a network such as the Internet. In other cases, identification is not specific to a particular individual. For example, computing system 102 of FIG. 1 may identify and track game player 112 without differentiating game player 112 from any other game player.

In some embodiments, a computing system may differentiate a game player from other game players without directly identifying the game player. For example, the computing system 102 of FIG. 1 may perform facial recognition, described in more detail below, or any other identification technique, without tying the game player to a particular user profile. The identification may be utilized to associate the game player with a particular representation within an application and/or other context of the computing system, such that input provided by the game player, regardless of the input mechanism utilized, is provided to the particular representation. For example, a game player may be identified via facial recognition while providing input associated with a particular character in a game. Thereafter, even if the game player utilizes a different input device, such as a different controller, the input provided by the game player may be associated with the particular character.

As indicated at 206, identifying a human subject optionally may include modeling the human subject with a virtual skeleton. Skeletal modeling may optionally be used to find the particular identity of an observed subject. For example, one or more characteristics detected via skeletal model (e.g., bone lengths, bone posture, etc.) may be used to look up a user identity in a look up table or other database. Such modeling is described in more detail with reference to FIG. 3.

Figure 3:
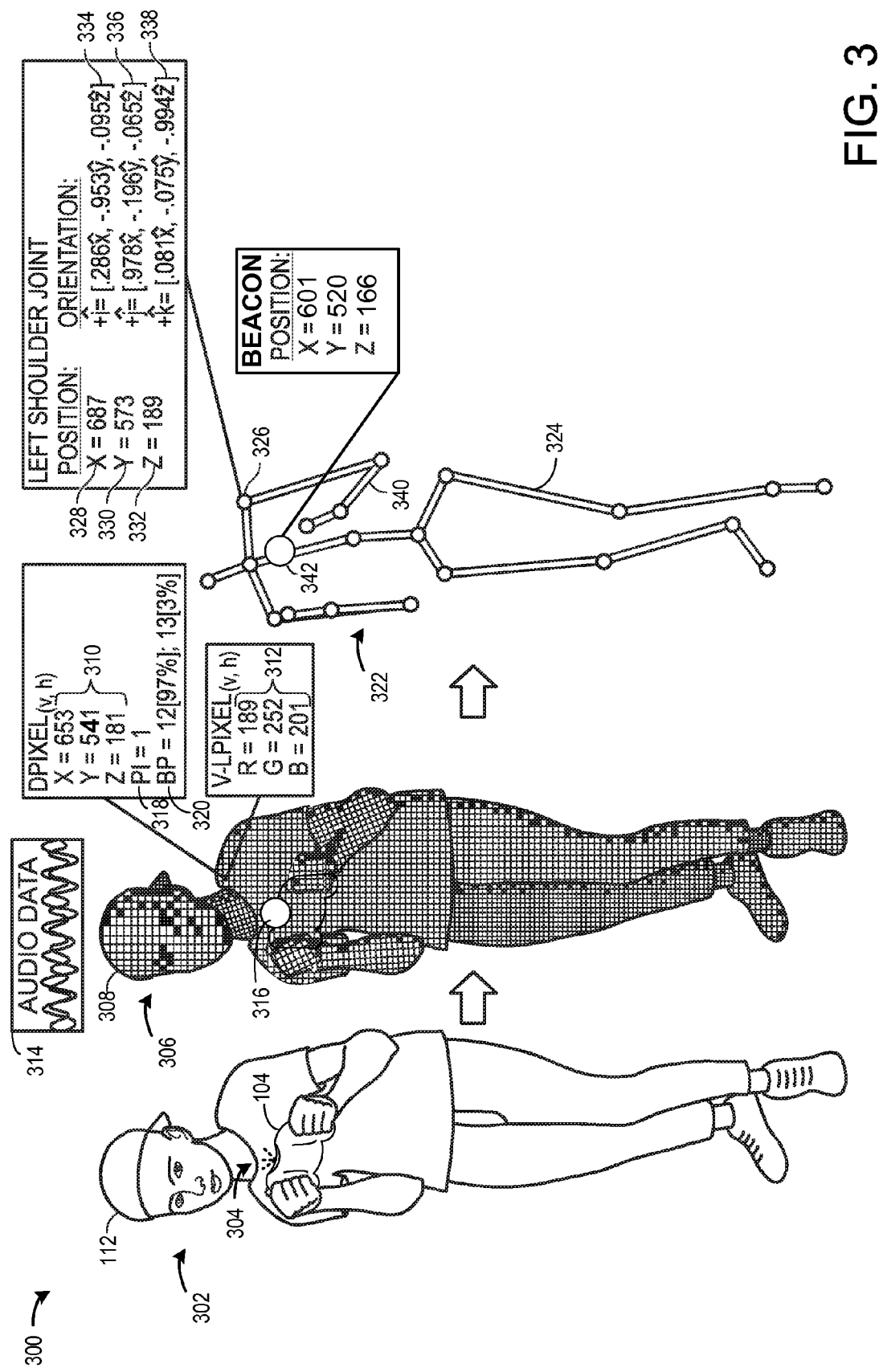
FIG. 3 schematically shows a nonlimiting example of a skeletal tracking pipeline in accordance with an embodiment of the present disclosure.

FIG. 3 graphically shows a simplified skeletal tracking pipeline 300 of a depth analysis system. For simplicity of explanation, skeletal tracking pipeline 300 is described with reference to computing system 102 of FIG. 1. However, skeletal tracking pipeline 300 may be implemented on any suitable computing system without departing from the scope of this disclosure. Furthermore, skeletal tracking pipelines that differ from skeletal tracking pipeline 300 may be used without departing from the scope of this disclosure.

At 302, FIG. 3 shows game player 112 of FIG. 1 from the perspective of a depth camera, such as depth camera 110 of FIG. 1. A depth camera, such as depth camera 110, may include one or more sensors (e.g., infrared light sensors) that are configured to observe a human subject, such as game player 112. The depth camera may also include one or more sources for illuminating the scene that is to be imaged (e.g., infrared diodes or lasers). The depth camera may also observe a beacon 304 that is emitted from a control device, such as control device 104. For example, beacon 304 may include an optical beacon, such as a visible light beacon and/or an infrared light beacon.

At 306, FIG. 3 shows a schematic representation 308 of the observation data collected by a depth camera, such as depth camera 110. The types of observation data collected will vary depending on the number and types of sensors included in the depth camera. For example, the depth camera may include an infrared camera configured to produce an infrared image.

A depth camera may determine, for each pixel of the depth camera, the depth of a surface in the observed scene relative to the depth camera. FIG. 3 schematically shows the three-dimensional x/y/z coordinates 310 observed for a DPixel[v,h] of a depth camera 110. Similar three-dimensional x/y/z coordinates may be recorded for every pixel of the depth camera. The three-dimensional x/y/z coordinates for all of the pixels collectively constitute a depth map. The three-dimensional x/y/z coordinates may be determined in any suitable manner without departing from the scope of this disclosure.

A visible light camera may determine, for each pixel of the visible light camera, the relative light intensity of a surface in the observed scene for one or more light channels (e.g., red, green, blue, grayscale, etc.). FIG. 3 schematically shows the red/green/blue color values 312 observed for a V-LPixel[v,h] of a visible light camera of depth camera 110. Similar red/green/blue color values may be recorded for every pixel of the visible light camera. The red/green/blue color values for all of the pixels collectively constitute a digital color image. The red/green/blue color values may be determined in any suitable manner without departing from the scope of this disclosure.

The depth camera and visible light camera may have the same resolutions, although this is not required. Whether the cameras have the same or different resolutions, the pixels of the visible light camera may be registered to the pixels of the depth camera. In this way, both color and depth information may be determined for each portion of an observed scene by considering the registered pixels from the visible light camera and the depth camera (e.g., V-LPixel[v,h] and DPixel[v,h]).

As illustrated at 316, beacon 304 may be configured such that observation data clearly differentiates the beacon from surrounding objects imaged by the depth camera. For example, beacon 304 may include an infrared light beacon that is represented in infrared images as a series of white or bright pixels arranged in accordance with a beacon pattern emitted by control device 104. Similarly, the infrared images may clearly differentiate a retroreflector reflecting passive infrared light.

One or more microphones may determine directional and/or nondirectional sounds coming from an observed human subject and/or other sources. FIG. 3 schematically shows audio data 314 recorded by a microphone, such as microphone 118 of control device 109. Such audio data may be determined in any suitable manner without departing from the scope of this disclosure. Sound source localization could also be used to find and/or locate a controlling device if instead of a light beacon, the control device produces a sound beacon.

The collected data may take the form of virtually any suitable data structure(s), including but not limited to one or more matrices that include an infrared intensity value for every pixel imaged by an infrared camera, a three-dimensional x/y/z coordinate for every pixel imaged by the depth camera, red/green/blue color values for every pixel imaged by the visible light camera, and/or time resolved digital audio data. While FIG. 3 depicts a single frame, it is to be understood that a human subject may be continuously observed and modeled (e.g., at 30 frames per second). Accordingly, data may be collected for each such observed frame. The collected data may be made available via one or more Application Programming Interfaces (APIs) and/or further analyzed as described below.

A depth camera and/or cooperating computing system optionally may analyze the depth map to distinguish human subjects and/or other targets that are to be tracked from non-target elements in the observed depth map. Each pixel of the depth map may be assigned a player index 318 that identifies that pixel as imaging a particular target or non-target element. As an example, pixels corresponding to a first player can be assigned a player index equal to one, pixels corresponding to a second player can be assigned a player index equal to two, and pixels that do not correspond to a target player can be assigned a player index equal to zero. Such player indices may be determined, assigned, and saved in any suitable manner without departing from the scope of this disclosure.

A depth camera and/or cooperating computing system optionally may further analyze the pixels of the depth map of a human subject in order to determine a part of that subject's body that each such pixel is likely to image. A variety of different body-part assignment techniques may be used to assess which part of a human subject's body a particular pixel is likely to image. Each pixel of the depth map with an appropriate player index may be assigned a body part index 320. The body part index may include a discrete identifier, confidence value, and/or body part probability distribution indicating the body part, or parts, to which that pixel is likely to image. Body part indices may be determined, assigned, and saved in any suitable manner without departing from the scope of this disclosure.

As one nonlimiting example, machine-learning can be used to assign each pixel a body part index and/or body part probability distribution. The machine-learning approach analyzes a human subject using information learned from a prior-trained collection of known poses. In other words, during a supervised training phase, a variety of different people are observed in a variety of different poses, and human trainers provide ground truth annotations labeling different machine-learning classifiers in the observed data. The observed data and annotations are used to generate one or more machine-learning algorithms that map inputs (e.g., observation data from a tracking device) to desired outputs (e.g., body part indices for relevant pixels).

At 322, FIG. 3 shows a schematic representation of a virtual skeleton 324 that serves as a machine-readable representation of game player 112. Virtual skeleton 324 includes twenty virtual joints—head, shoulder center, spine, hip center, right shoulder, right elbow, right wrist, right hand, left shoulder, left elbow, left wrist, left hand, right hip, right knee, right ankle, right foot, left hip, left knee, left ankle, and left foot. This twenty joint virtual skeleton is provided as a nonlimiting example. Virtual skeletons in accordance with the present disclosure may have virtually any number of joints.

The various skeletal joints may correspond to actual joints of a human subject, centroids of the human subject's body parts, terminal ends of a human subject's extremities, and/or points without a direct anatomical link to the human subject. Each joint may have at least three degrees of freedom (e.g., world space x, y, z). As such, each joint of the virtual skeleton may be defined with a three-dimensional position. For example, a left shoulder virtual joint 326 is defined with an x coordinate position 328, a y coordinate position 330, and a z coordinate position 332. The position of the joints may be defined relative to any suitable origin. As one example, a depth camera may serve as the origin, and all joint positions are defined relative to the depth camera. Joints may be defined with a three-dimensional position in any suitable manner without departing from the scope of this disclosure.

A variety of techniques may be used to determine the three-dimensional position of each joint. Skeletal fitting techniques may use depth information, color information, body part information, and/or prior trained anatomical and kinetic information to deduce one or more skeleton(s) that closely model a human subject. As one nonlimiting example, the above described body part indices may be used to find a three-dimensional position of each skeletal joint.

A joint orientation may be used to further define one or more of the virtual joints. Whereas joint positions may describe the position of joints and virtual bones that span between joints, joint orientations may describe the orientation of such joints and virtual bones at their respective positions. As an example, the orientation of a wrist joint may be used to describe if a hand located at a given position is facing up or down.

Joint orientations may be encoded, for example, in one or more normalized, three-dimensional orientation vector(s). The orientation vector(s) may provide the orientation of a joint relative to the tracking device or another reference (e.g., another joint). Furthermore, the orientation vector(s) may be defined in terms of a world space coordinate system or another suitable coordinate system (e.g., the coordinate system of another joint). Joint orientations also may be encoded via other means. As non-limiting examples, quaternions and/or Euler angles may be used to encode joint orientations.

FIG. 3 shows a nonlimiting example in which left shoulder virtual joint 326 is defined with orthonormal orientation vectors 334, 336, and 338. In other embodiments, a single orientation vector may be used to define a joint orientation. The orientation vector(s) may be calculated in any suitable manner without departing from the scope of this disclosure.

Joint positions, orientations, and/or other information may be encoded in any suitable data structure(s). Furthermore, the position, orientation, and/or other parameters associated with any particular joint may be made available via one or more APIs.

As seen in FIG. 3, virtual skeleton 324 may optionally include a plurality of virtual bones (e.g. a left forearm bone 340). The various skeletal bones may extend from one skeletal joint to another and may correspond to actual bones, limbs, or portions of bones and/or limbs of a human subject. The joint orientations discussed herein may be applied to these bones. For example, an elbow orientation may be used to define a forearm orientation.

The virtual skeleton may be used to identify a human subject by comparing the values associated with each element of the skeleton (e.g., relative locations of joints and/or bones) with known virtual skeleton values for a particular human subject. For example, a game player may be imaged and a virtual skeleton associated with that player may be stored in a look up table. Thereafter, when the game player is imaged, a generated virtual skeleton may be compared to the stored virtual skeleton. For example, a computing system may include a user profile for each member of a family, including, in order of decreasing virtual skeleton size, a father, mother, son, and daughter. In order to identify a particular user and select a profile associated with that user, a size of the virtual skeleton of the user may be compared to the size of the virtual skeleton associated with each user profile.

In some embodiments, the virtual skeleton may be used to compare a location of an object and/or a beacon, such as beacon 304 as represented at 342, to a location on a game player. For example, a position of beacon 304, as represented at 342, may be determined based on imaged surfaces near the beacon. Accordingly, an imaged surface representing a controller may be used to determine one or more coordinates associated with a detected beacon. Upon determining the position of the beacon, the proximity of beacon 304 or a known location of control device 104 to a hand or other joint of virtual skeleton 324 may be analyzed to determine whether the control device may be associated with game player 112. The association of the control device with a game player is discussed further with reference to FIG. 2 below.

In some embodiments, association of a control device and/or other object to a subject may be performed based on a suitable parameter of the control device in relation to the subject. For example, a game player may place different control devices in different location of an environment, such as environment 100 of FIG. 1. The game player may then perform a gesture or otherwise indicate a particular control device to which a user input is to be associated. Accordingly, a control device may be associated with a subject based on a gesture of the subject, even if another subject is in closer proximity to the control device. It is to be understood, however, that a virtual skeleton may be used for additional and/or alternative purposes without departing from the scope of this disclosure.

Turning back to FIG. 2, as indicated at 208, identifying the human subject optionally may include facial recognition. For example, facial recognition algorithms may be applied to depth images, raw infrared images, color images, and/or images from a visible light camera. Facial recognition may optionally be used to find the particular identity of an observed subject. For example, one or more characteristics detected via facial recognition (e.g., eye separation, eye-eye-mouth triangle, etc.) may be used to look up a user identity in a look up table or other database. To reduce computing power needed, the parts of images that are analyzed for facial recognition may be limited to an area around a head joint of a virtual skeleton, such as virtual skeleton 324 of FIG. 3.

Additionally, as indicated at 210, identifying the human subject optionally may include voice recognition. For example, audio input may be received from a microphone, such as microphone 118 of FIG. 1, and parameters associated with the audio input, such as frequency, amplitude, breathing patterns, etc., may be analyzed and/or compared to audio parameters associated with a user and stored in a look up table or other database to identify the user.

As indicated at 212, the method may optionally include outputting a message requesting an object to emit a beacon. For example, computing system 102 of FIG. 1 may request via one or more RF frequencies that one or more of the control devices 104, 106, and/or 108 emit a beacon so that the computing system may resolve a respective location of the control device in environment 100. In some embodiments, the computing system may request that the object emits a particular beacon. For example, computing system 102 may output a message to each object individually, requesting a different beacon from each object. Computing system 102 may also output one or more messages to assign time slices to the control devices for emitting the same beacon at different times. Likewise, computing system 102 may output any other suitable sequence of messages that will enable the system to detect and associate the beacon that it observes with an object that it communicates with via another communication medium, such as RF, wired cable, etc. In additional or alternative embodiments, computing system 102 may output and/or broadcast a general message that is not directed to a particular object, requesting an object to emit a beacon.

As indicated at 214, method 200 includes recognizing within one or more of the depth images and/or infrared images a beacon emitted from an object. A beacon may be recognized within depth images and/or infrared images in any suitable manner. For example, as shown in FIG. 3, a beacon from control device 104 may be represented in observational data, as schematically represented at 308, as a bright spot illustrated at 316 that is distinguishable from surrounding elements imaged by a depth camera. One or more parameters of the beacon may be analyzed to identify and distinguish a first object from a plurality of different objects. These parameters may include virtually any suitable parameter of the beacon, including but not limited to an intensity, a pattern, and/or a frequency of the beacon. The parameters may be used to find the first object in a look up table that includes one or more objects and one or more parameters associated with the objects. For example, a first object may emit a beacon with one or more different parameters from a beacon emitted by a second object. Objects may additionally or alternatively emit beacons in a time-slice and/or sequential manner such that a time and/or order parameter may be different between objects.

As indicated at 216, method 200 includes assessing a position of the object in three dimensions. For example, computing system 102 of FIG. 1 may utilize pixel information from depth camera 110 to determine x, y, and z coordinates of a control device within environment 100. The position of the object may be relative to the position of depth camera 110, a subject imaged by depth camera 110, and/or any other suitable reference point. In some embodiments, assessing the position of the control device may include identifying the control device within the depth images and/or infrared images and/or may include tracking the position of the control device over time to identify and interpret control gestures from the tracked position. In some embodiments, multiple beacons may be emitted at known locations on the controlling device in order to enable the computing system to compute the controller location. Additional beacons also add redundancy in case some of the beacons are occluded from the sensor. For example, fingers of a game player may be inadvertently placed over a location of a beacon emitter on the control device.

Method 200 further includes associating the object with the human subject based on a proximity of the control device to the human subject, as indicated at 218. For example, control device 104 of FIG. 1 may be associated with game player 112 due to the proximity of the control device to the game player. Conversely, control device 106 may not be associated with either game player 112 or 114, due to the distance between control device 106 and game players 112 and 114. Instead, control device 106 may be associated with table 116. The proximity may be determined based on any suitable threshold.

In some embodiments, the location of the object may be compared to a location of a particular part of a human subject. As indicated at 220, associating the object with the human subject may optionally include analysis of a hand joint position. Turning briefly to FIG. 3, a distance between a hand joint of virtual skeleton 324 and a location of control device 104 (e.g., as determined at 216 of method 200) may be compared to a distance threshold. Although the hand joint is analyzed at 220, it is understood that virtually any suitable joint and/or portion of the virtual skeleton may be analyzed to determine a distance between the joint and/or portion and an object. In some embodiments, an object may be associated with a human subject if the object is within a threshold distance of a hand joint of the human subject. However, the object may not be associated with the human subject if the distance between the object and the hand joint exceeds the threshold distance. In some embodiments without full skeletal tracking, a location of the head/face and the controller along the horizontal axis can be used to determine association.

Associating the control device with the human subject may include attributing a gesture input of the virtual skeleton and a control input of the control device to a same source. For example, such association may allow a user to provide multiple types of user input utilizing multiple devices to control a single player representation. Associating the object with the human subject may additionally or alternatively include applying a settings profile of the human subject to an application controlled by the object. In some embodiments, associating the object with the human subject may include presenting user-specific content via an application controlled by the object. For example, the user-specific content may be game content, media programming, advertising, and/or any suitable content selected for the human subject. In some embodiments, association of the object may change when passing an object from one user to another. For example, association may dynamically update based on a user that is nearest and/or providing input to the object.

A control device or other object may also emit a beacon to perform a binding operation with a computing system. For example, computing system 102 of FIG. 1 may not accept input from control device 106 until a binding operation is successfully completed. As used herein, the term "unbound" may refer to an object that is not bound to a particular computing system and/or an object that is not bound to any computing system.

Figure 4:
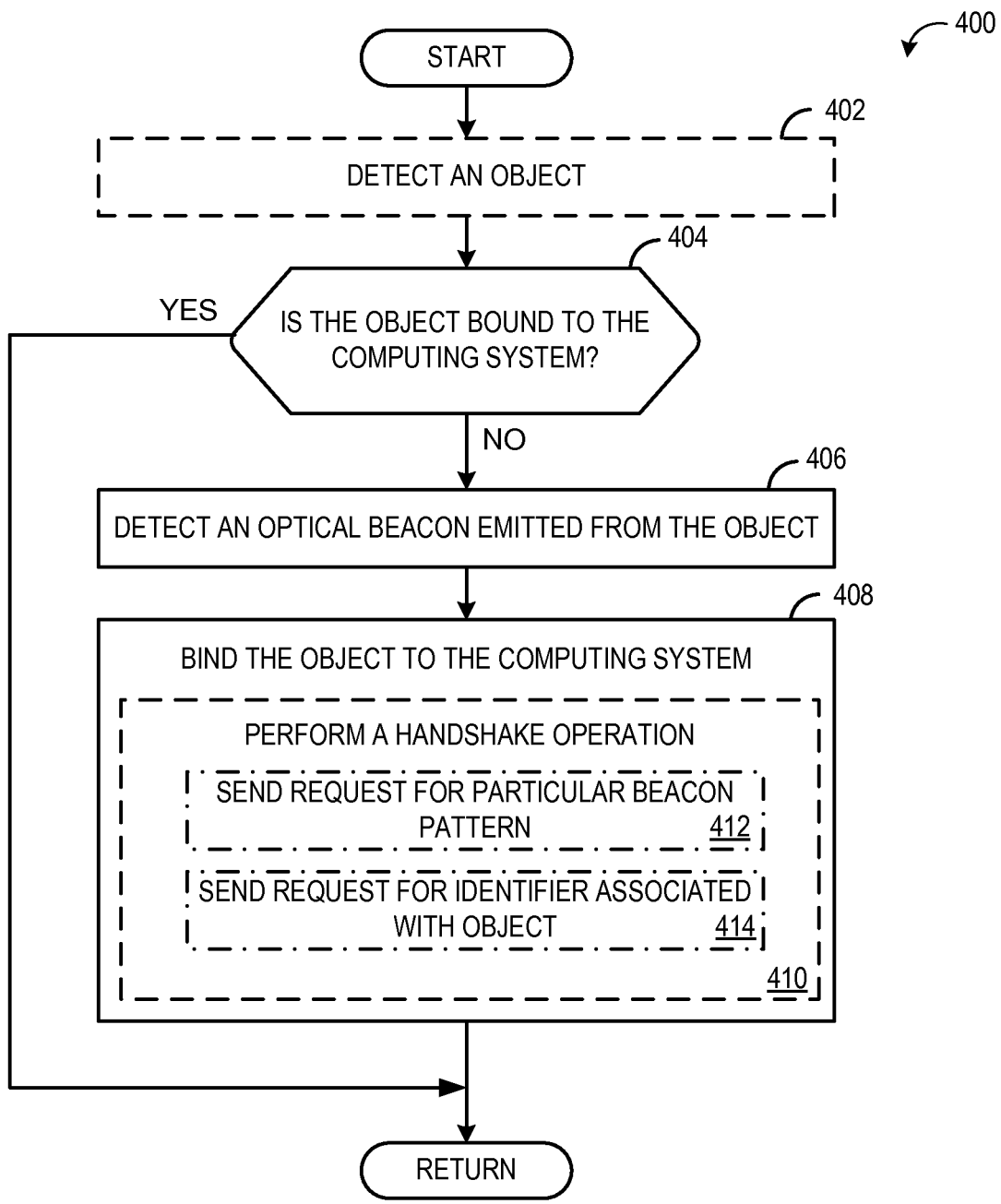
FIG. 4 shows a method of binding a control device to a computing system in accordance with an embodiment of the present disclosure.

FIG. 4 illustrates a method 400 of performing a binding operation at a computing system. At 402, method 400 optionally includes detecting an object. An object may be detected by a computing system in any suitable manner. For example, computing system 102 of FIG. 1 may detect an object, such as control device 106 in one or more depth images received from depth camera 110. Additionally or alternatively, computing system may detect an object based on a beacon emitted by the object, including but not limited to an optical beacon, an audio beacon, an RF beacon, etc. In some embodiments, the object may be detected at 406, described below.

As indicated at 404, method 400 includes determining if the object is bound to the computing system. For example, the computing system may identify the object, and determine whether the identified object is bound to the computing system. In some embodiments, the computing system may determine whether the object is bound to the computing system based on a beacon emitted by the object, such as the beacon detected at 406. For example, control devices that are not bound to the computing system may emit a beacon and/or may emit a particular beacon to advertise an unbound state. Therefore, if the object emits a beacon and/or emits a particular beacon, the computing system may determine that the object is not bound to the computing system. Conversely, if the object does not emit a beacon, the object may be determined to be bound to the computing system. If the object is bound to the computing system, no binding operation is necessary, therefore, the method returns to the start of method 400.

If the object is determined to be unbound, method 400 proceeds to 406, where the method includes detecting an optical beacon emitted from the object. For example, an object, such as control device 106 of FIG. 1, may automatically emit an optical beacon in response to changing states if the control device is not bound to computing system 102. Changing states may include changing from an inactive state to an active state. For example, changing from an inactive state to an active state may include changing from a power off state to a power on state. In some embodiments, changing from an inactive state to an active state may additionally or alternatively be performed as a result of detecting interaction with the control device by a user. Detecting interaction may include detecting actuation of a control element of the control device, detecting a signal from a sensor of the control device, and/or be performed in any other suitable manner. For example, control device 106 may change from an inactive state to an active state when a user removes control device 106 from table 116.

The computing system may detect an optical beacon in a similar manner to those described above. For example, the computing system may recognize an optical beacon in one or more images and/or depth images received from a visible light camera and/or a depth camera. In some embodiments, the computing system may include an infrared sensor to detect an infrared light beacon and/or a visible light sensor to detect a visible light beacon that is emitted from the object. For example, a depth camera may include an infrared-pass filter in front of an infrared sensor in order to filter out visible light and allow infrared light having a particular range of wavelengths to be detected by the infrared sensor. Accordingly, an object may emit a beacon with a wavelength that is matched to an infrared-pass filter so that it may be detected by the depth camera.

As indicated at 408, method 400 includes binding the object to the computing system. For example, the computing system may automatically enter a binding mode upon detection of an optical beacon and/or an object that is unbound in order to bind the object to the computing system.

As indicated at 410, binding the object to the computing system may optionally include performing a handshake operation to verify the identity of the control device. The handshake operation may be performed in virtually any suitable manner. In some embodiments, performing a handshake operation may optionally include sending a request for a particular beacon pattern, as indicated at 412. For example, computing system 102 of FIG. 1 may send a request to control device 106 to emit a particular beacon pattern. The request may identify any suitable pattern, including but not limited to number, duration, and/or frequency of optical signals to be emitted from the control device. A control device may also include a plurality of light sources that may be independently controlled to emit a particular beacon. Accordingly, the request may identify a particular beacon pattern for one or more light sources of the plurality of light sources, such that a first light source may be requested to emit a different pattern than a second light source. If the requested beacon pattern and/or patterns are detected by the computing system, such as through analysis of depth images, the computing system may identify and/or determine the position of the control device.

Performing a handshake operation may additionally or alternatively include sending a request for an identifier associated with the object, as indicated at 414. For example, computing system 102 of FIG. 1 may send a request to control device 106 for an identifier associated with control device 106. Upon receiving an identifier for control device 106, computing system 102 may authenticate the control device and may bind the control device to the computing system. In some embodiments, computing system 102 may assign a unique identifier to the object to bind the object upon completing a handshake operation. Binding an object to a computing system may be performed in any suitable manner, including but not limited to storing an identifier for the object in a storage machine and/or database.

Figure 5:
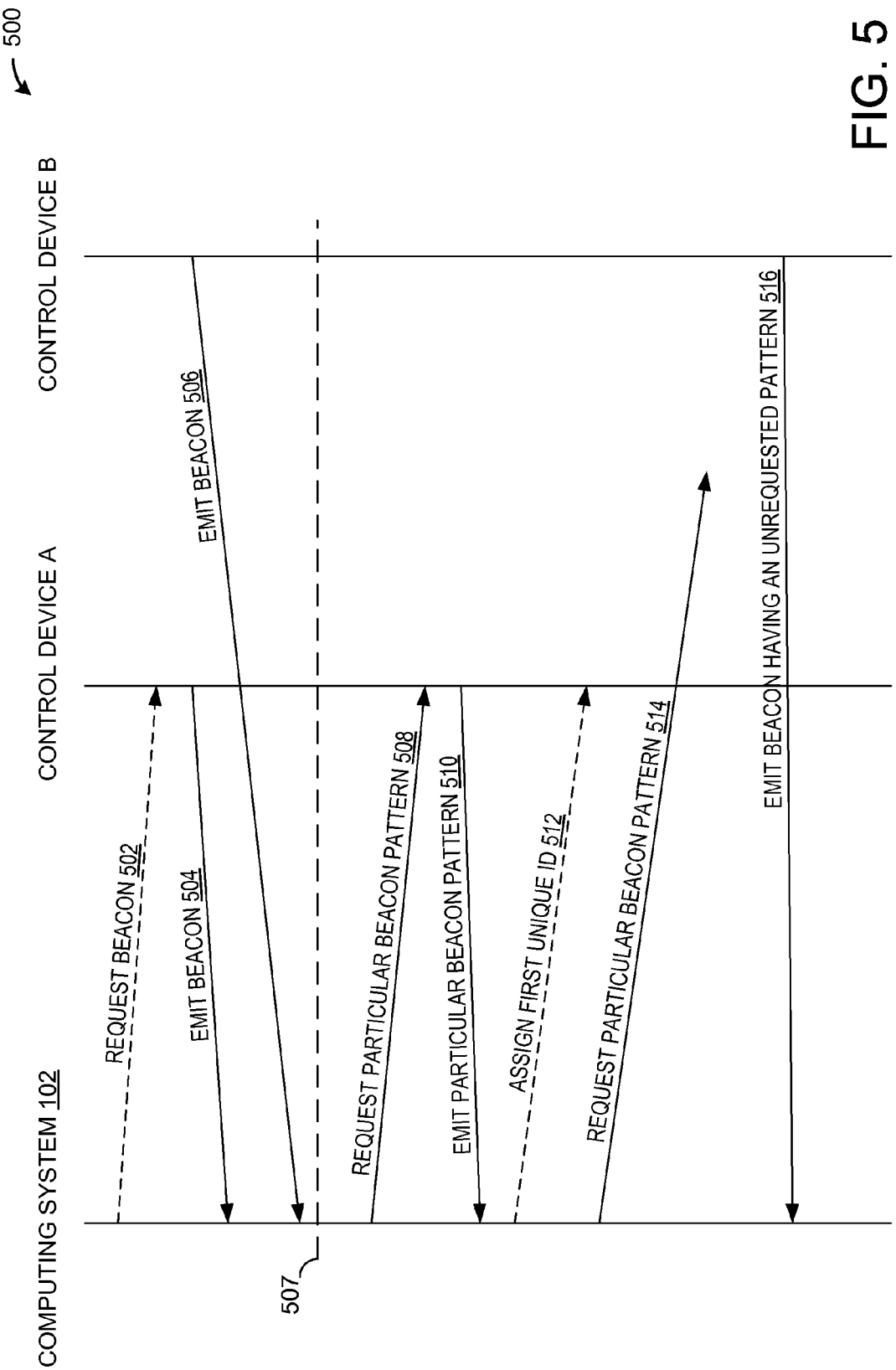
FIG. 5 schematically shows an example communication diagram for an environment including a computing system and two or more control devices in accordance with an embodiment of the present disclosure.

FIG. 5 illustrates example communications 500 between computing system 102 of FIG. 1 and two control devices during a binding operation. The communications may optionally begin with computing system 102 sending a request for control device A to emit a beacon at 502. In response or independently, control device A may emit a beacon at 504. For example, the computing system 102 may not be able to send a request to a control device when the control device is in an unbound state. Accordingly, control device A may emit a beacon at 504 when the control device is in an unbound state without receiving a request from the computing system. The beacon emitted at 504 may be a particular beacon pattern associated with a binding request and/or binding mode of the control device. Likewise, control device B may emit a beacon at 506. In response to receiving the beacon from either control device A or control device B, computing system 102 may enter a binding mode at 507 in order to bind control device A and/or control device B.

In some embodiments, binding may occur before the computing system provides any commands or requests to the control device. For example, computing system 102 may automatically bind with control device A upon receipt of the beacon emitted at 504. In additional or alternative embodiments, computing system 102 may initiate a handshake operation by requesting a particular beacon pattern from control device A at 508. For example, computing system 102 may determine or negotiate an RF channel over which control device A may communicate. In some embodiments, the beacon emitted at 504 and/or 506 may be a different type beacon than the beacon requested at 508. For example, the beacon emitted at 504 may be an infrared beacon, while the beacon requested at 508 may be an RF signal. In some embodiments, the RF channel may be specific to control device A. Computing system 102 may then specifically address control device A by sending a request for the particular beacon pattern over the channel. In response, control device A emits the particular beacon pattern at 510. Upon confirming that the beacon pattern emitted by control device A is the same and/or within a threshold of the requested particular beacon pattern, computing system 102 may bind control device A and/or confirm or finalize a previously-executed binding operation. For example, as indicated at 512, computing system 102 may assign and send a first unique ID to control device A and/or store the unique ID in order to bind control device A. Upon binding, control device A and computing system 102 may freely communicate with one another in any suitable manner, such as utilizing a particular RF channel. In other words, computing system 102 may allow control device A to issue commands once the binding operation has been performed.

As indicated at 514, computing system 102 may also request that control device B emit a particular beacon pattern. In some embodiments, the particular pattern may be the same as the particular beacon pattern requested at 508, while in other embodiments, the particular pattern may be different than the particular beacon pattern requested at 508. For example, if the particular pattern is the same, the computing system may associate a time value to the pattern to differentiate a pattern received from control device A from a pattern received from control device B. Conversely, if the particular pattern is different for each control device, the computing system may be able to differentiate two beacons received at the same time. After the request sent at 514, control device B may emit a beacon having an unrequested pattern at 516. For example, while the request sent at 514 may be intended for control device B, control device B may not receive the request. Therefore, control device B may emit a beacon having a pattern that is different than and/or outside of a similarity threshold of the pattern requested at 514. In response, computing system 102 may determine that reliable communication may not be established with control device B, and thus may not bind control device B. In some embodiments, computing system 102 may attempt to bind with control device B again by sending another request for a particular beacon pattern. In additional or alternative embodiments, computing system 102 may automatically bind with control device B after receiving a number of beacons from control device B that exceeds a threshold. In some embodiments, the threshold number of beacons may be one, such that computing system 102 binds a control device or other object immediately upon detecting a beacon emitted by the control device or other object.

As described above, an infrared beacon may be used to actively emit infrared light that can be detected by an infrared camera and used to assess the three-dimensional position of the control device emitting the infrared light. As described below, at least some of the benefits of this type of locating and/or tracking alternatively and/or additionally may be achieved using a passive reflector that reflects infrared light that is emitted towards the control device including the reflector. Such passive reflection can decrease energy consumed by the control device because active emission of infrared light can be reduced or eliminated. Such energy reduction can increase battery life of the control device. In some embodiments the environmental illuminator used to generate the light for reflection may be the same illuminator used for depth imaging. As such, passive reflection need not use light that is not already serving another purpose.

Figure 6:
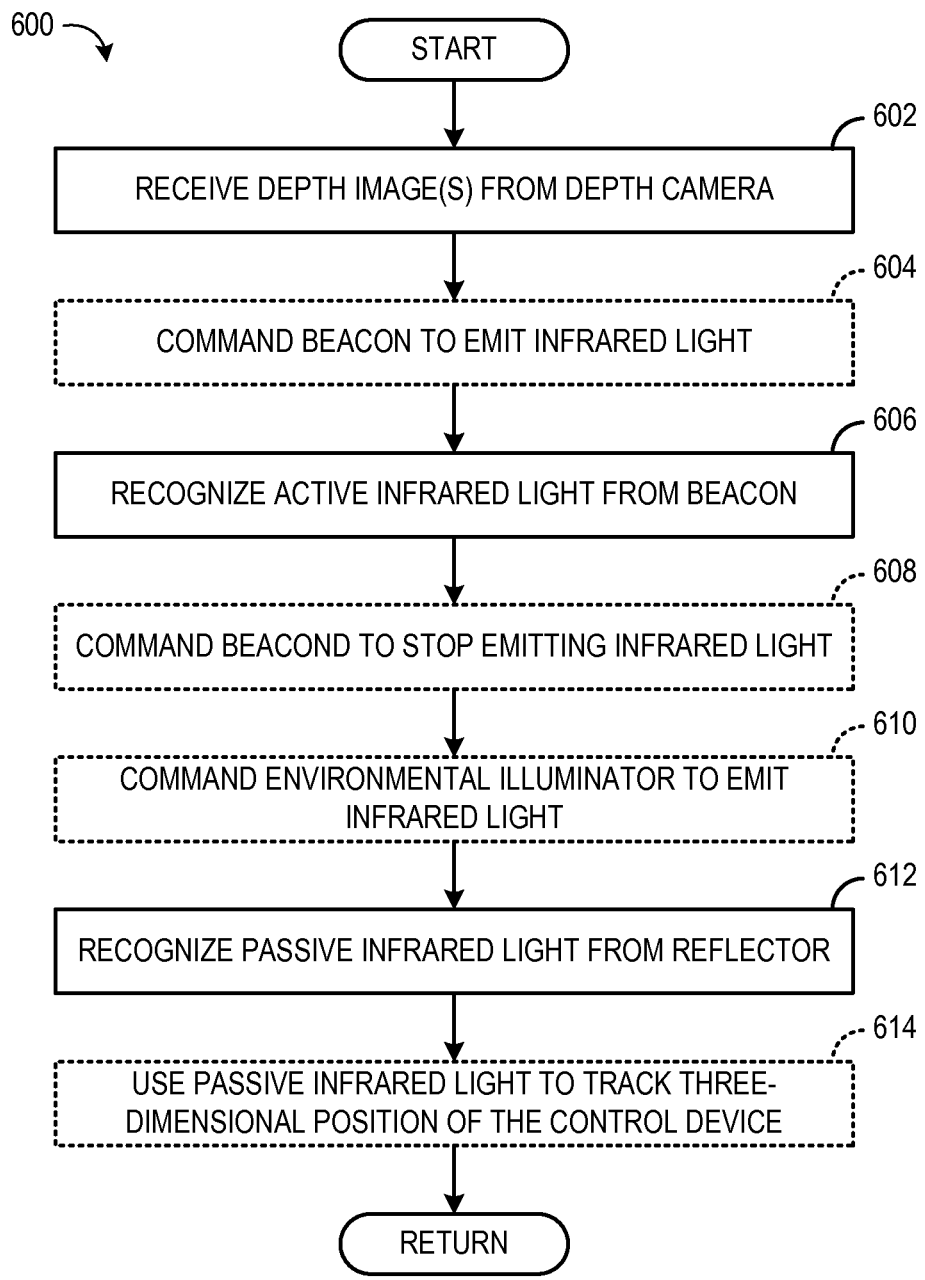
FIG. 6 shows a method of using a passive reflector to locate and/or track a control device in accordance with an embodiment of the present disclosure.

FIG. 6 shows an example method 600 of using a passive reflector to locate and/or track a control device. Method 600 may be performed by computing system 102 of FIG. 1 or computing system 800 of FIG. 8, for example. Method 600 may be used independently and/or as an extension of method 400 described above. At 602, method 600 includes receiving one or more infrared images from an infrared camera. Such infrared images may be related to and/or used to generate depth images. As described above with reference to FIG. 3, each depth image may indicate a depth of a surface imaged by each pixel of the depth image.

At 604, method 600 optionally includes commanding an infrared beacon of a wireless control device to emit infrared light. Such a command may be delivered via radiofrequency communication, for example. At 606, method 600 includes recognizing within one or more of the infrared images an active infrared light emitted from the beacon of the wireless control device. At 608, method 600 optionally includes commanding the beacon to stop emitting infrared light. The beacon control and recognition of 604, 606, and/or 608 may be implemented as described above with reference to FIGS. 1-5. As one nonlimiting example, the active beacon may be used to locate a wireless control device upon startup or whenever a position of the wireless controller is lost.

At 610, method 600 optionally includes commanding an environmental illuminator to emit infrared light. The beacon recognition described above may optionally be performed when an environmental illuminator (e.g., IR blaster, time-of-flight infrared projector, structured light infrared projector, etc.) is not emitting infrared light so that passive reflectors will not be confused with active beacons. In other words, the environment may be temporarily controlled so as to limit the amount of infrared light that is likely to be detected from the reflectors by the infrared camera. As such, the infrared light that is detected may more confidently be attributed to the active beacon as opposed to a passive reflector. However, once the active beacon is identified and located, it may be turned off and the environmental illuminator(s) may be used to emit infrared light that can be reflected by the reflector(s) of the wireless control device. In some embodiments, the beacon recognition may optionally be performed while the environmental illuminator remains active. For example, modulation and/or other parameters of the beacon light may be used to differentiate the active beacon from passive reflectors.

At 612, method 600 includes recognizing within one or more of the infrared images a passive infrared light reflected from a reflector of the control device. At 614, method 600 optionally includes using passive infrared light to track the three-dimensional position of the control device. The recognition and tracking of 612 and 614 may occur after the beacon of the wireless control device stops emitting the active infrared light. As such, the system is able to locate and/or track a control device in an energy efficient manner in which the beacon of the wireless control device does not continuously signal. The active beacon may be used intermittently on an as-needed basis to associate and/or confirm a unique ID for a particular passive reflector and/or corresponding control device. It is to be understood that all of the active location, tracking, association, and other functions described above with reference to FIGS. 1-4 may also be implemented when the camera recognizes passive reflected light instead of or in addition to active beacon light.

Figure 7:
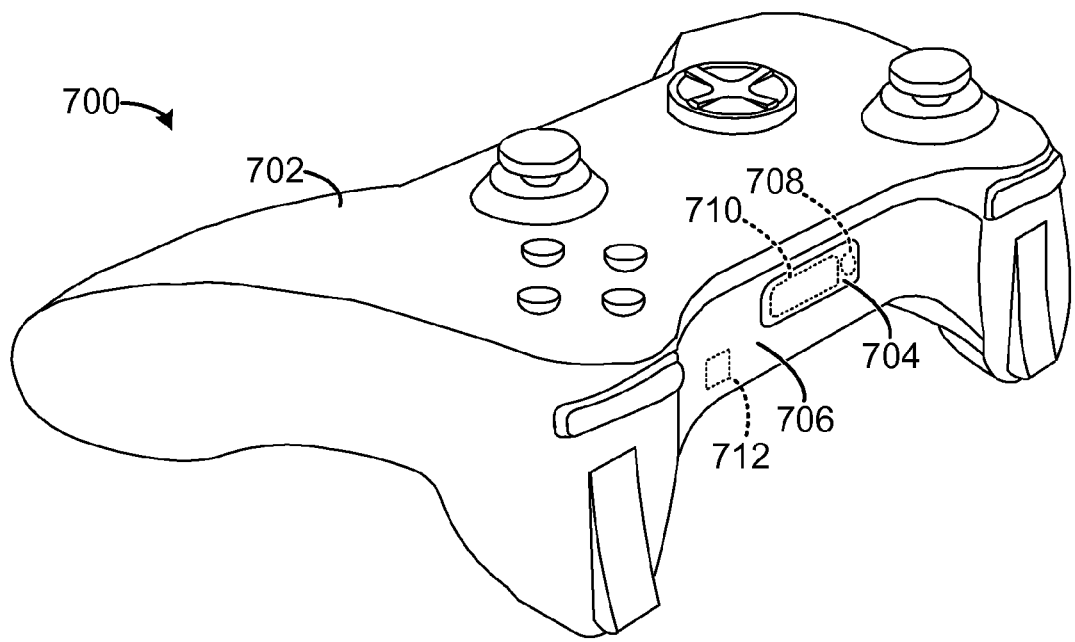
FIG. 7 shows a wireless control device including a passive reflector in accordance with an embodiment of the present disclosure.

FIG. 7 shows an example wireless control device 700. While control device 700 is illustrated as a console game controller, it is to be understood that a variety of different control device may be used without departing from the scope of this disclosure.

Control device 700 includes a housing 702 that includes a light-transmissive portion 704. The light-transmissive portion may be configured to transmit light having different wavelengths to different degrees. As one nonlimiting example, light-transmissive portion 704 may be greater than 50% transmissive to infrared light but less than 50% transmissive to visible light. While FIG. 7 shows a single light-transmissive portion on a front side of control device 700, it is to be understood that one or more different light-transmissive portions may be located virtually anywhere on a control device. Further, while FIG. 7 shows a light-transmissive window surrounded by opaque portion(s) 706, the entire housing may be light-transmissive.

Control device 700 includes an infrared beacon 708 interior the housing and positioned to emit infrared light through light-transmissive portion 704 of housing 702. In other words, the infrared beacon 708 may be positioned behind the light-transmissive window so that it is protected but remains visible. The infrared beacon may be mounted directly to the light-transmissive portion or the infrared beacon may be spaced away from the light-transmissive portion. The infrared beacon may include a light emitting diode, laser diode, and/or other light source. The infrared beacon may also include one or more optics to focus, filter, or otherwise condition light for easy detection. As one nonlimiting example, light-transmissive portion 704 may optionally be configured to focus, filter, or otherwise condition light.

Control device 700 includes a reflector 710 interior the housing. Reflector 710 is positioned to reflect light entering the housing through light-transmissive portion 704. For example, reflector 710 may reflect infrared light from an IR blaster, time-of-flight infrared projector, structured light infrared projector and/or other environmental illuminator. As discussed above, such an environmental illuminator may be intelligently controlled, for example by computing system 102 of FIG. 1 or computing system 800 of FIG. 8. Reflector 710 may reflect the infrared light back out of the housing through the light-transmissive portion so that it can be detected by a camera, such as an infrared and/or depth camera.

Reflector 710 may be a retroreflector. As an example, the reflector 710 may be configured as a retroreflective tape configured as a sheeting that includes cube corner (microprism) retroreflective elements integrally bonded to a flexible polymeric film. The prism surfaces may be coated with a vacuum deposition of aluminum to provide a mirror surface to the prism facets. In some embodiments, the retroreflective tape is characterized by a specular gloss of not less than 40 when tested in accordance with ASTM method D523 at an angle of 85°. Further, the coefficient of retroreflection may be at least 15 for an observation angle of 0.5 degrees and an entrance angle of 30 degrees, and at least 75 for an observation angle of 0.2 degrees and an entrance angle of −4 degrees.

The reflector 710 may be affixed directly to the light-transmissive portion or the reflector may be spaced away from the light-transmissive portion. While the infrared beacon 708 and reflector 710 are illustrated as being behind the same light-transmissive portion 704, this is not required. The reflector 710 and the infrared beacon 708 may be positioned behind different light transmissive portions. Further, while a single infrared beacon and a single reflector 710 are illustrated, it is to be understood that two or more infrared beacons and/or two or more reflectors may be used. Similarly, zero infrared beacons or zero reflectors may be used in some embodiments. Infrared beacons and reflectors may be positioned virtually anywhere about the control device, internally and/or externally, without departing from the scope of this disclosure.

Control device 700 includes a wireless communicator 712 interior the housing. Communicator 712 may be configured to wirelessly send and wirelessly receive commands via radiofrequency communication. For example, the communicator 712 may be configured to communicate with computing system 102 of FIG. 1 or computing system 800 of FIG. 8. In this way, a computing device may send commands to the control device (e.g., emit light via infrared beacon 708, rumble, etc.) and/or the control device 700 may send commands to the computing device. The commands sent from the control device to another computing device may take a variety of different forms depending on the configuration of the control device and/or the current function of the computing device. As nonlimiting examples, the commands may include a game command for controlling an electronic game facilitated by the electronic device. As another example, the command may include an audio-visual command for controlling an audio-visual experience (e.g., television, movie, etc.) facilitated by the electronic device.

A control device may further include button(s), directional pad(s), analog stick(s), rumble motor(s), dial(s), display(s), touch display(s), track pad(s), scroll wheel(s), track ball(s), microphone(s), camera(s), and/or other mechanisms for receiving user input.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
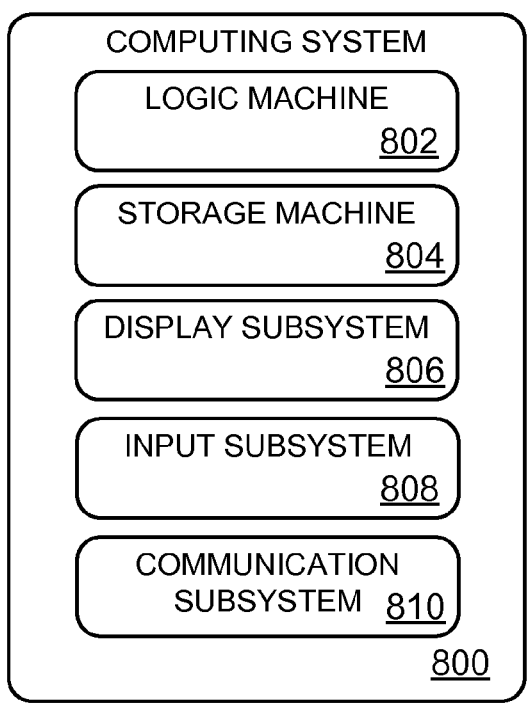
FIG. 8 is an example computing system in accordance with an embodiment of the present disclosure.

FIG. 8 schematically shows a non-limiting embodiment of a computing system 800 that can enact one or more of the methods and processes described above. Computing system 800 is shown in simplified form. Computing system 800 may take the form of one or more gaming consoles, personal computers, server computers, tablet computers, home-entertainment computers, network computing devices, mobile computing devices, mobile communication devices (e.g., smart phone), and/or other computing devices. For example, computing system 800 may include computing system 102 of FIG. 1.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. For example, logic machine 802 may be in operative communication with a depth camera interface, such as an interface of depth camera 110, and storage machine 804. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices. For example, display subsystem 806 may include display device 124 of FIG. 1.

When included, input subsystem 808 may comprise or interface with one or more user-input devices such as a keyboard, mouse, touch screen, microphone, or game controller. For example, input subsystem may include or interface with control devices 104, 106, 108, and/or 109 of FIG. 1. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A control device, comprising:
   a light-opaque housing defining a left-hand grip portion, a right-hand grip portion, and a rim therebetween forming an opening into an interior space of the control device;
   a light-transmissive window flush with the rim of the light-opaque housing and covering the opening thereby protecting the interior space;
   a wireless communicator positioned in the interior space to wirelessly send a command for controlling an electronic device; and
   a reflector positioned in the interior space behind the light-transmissive window to reflect light entering through the light-transmissive window back out of the light-transmissive window.

2. The control device of claim 1, where the reflector is a retroreflector.

3. The control device of claim 2, where the retroreflector is a retroreflective tape including reflective microprism elements integrally bonded to a polymeric film.

4. The control device of claim 3, where the retroreflective tape is affixed to an inner side of the light-transmissive window.

5. The control device of claim 1, further comprising an infrared beacon positioned in the protected interior space behind the light-transmissive window to emit infrared light through the light-transmissive window.

6. The control device of claim 5, where the wireless communicator is configured to wirelessly receive a command to emit the infrared light.

7. The control device of claim 1, where the light-transmissive window is greater than 50% transmissive to infrared light.

8. The control device of claim 7, where the light-transmissive window is less than 50% transmissive to visible light.

9. The control device of claim 1, where the wireless communicator is configured to wirelessly send and wirelessly receive commands via radio frequency communication.

10. The control device of claim 1, where the command is a game command for controlling an electronic game facilitated by the electronic device.

11. The control device of claim 1, where the command is an audio-visual command for controlling an audio-visual experience facilitated by the electronic device.

12. A control device, comprising:
   a light-opaque housing defining a left-hand grip portion, a right-hand grip portion, and a rim that forms an opening into an interior space of the control device, the rim that forms the opening being positioned intermediate the left-hand grip portion and the right-hand grip portion;
   a light-transmissive window flush with the rim of the light-opaque housing and covering the opening thereby protecting the interior space, the light-transmissive window having a transmittance of infrared light that is greater than a transmittance of visible light;
   an infrared beacon positioned in the interior space behind the light-transmissive window to emit an active infrared light through the light-transmissive window; and
   a wireless communicator interior the housing to wirelessly receive a command to emit the active infrared light.

13. The control device of claim 12, further comprising an infrared retroreflector positioned in the interior space behind the light-transmissive window to reflect infrared light entering through the light-transmissive window back out of the light-transmissive window.

\* \* \* \* \*